Patented June 1, 1954

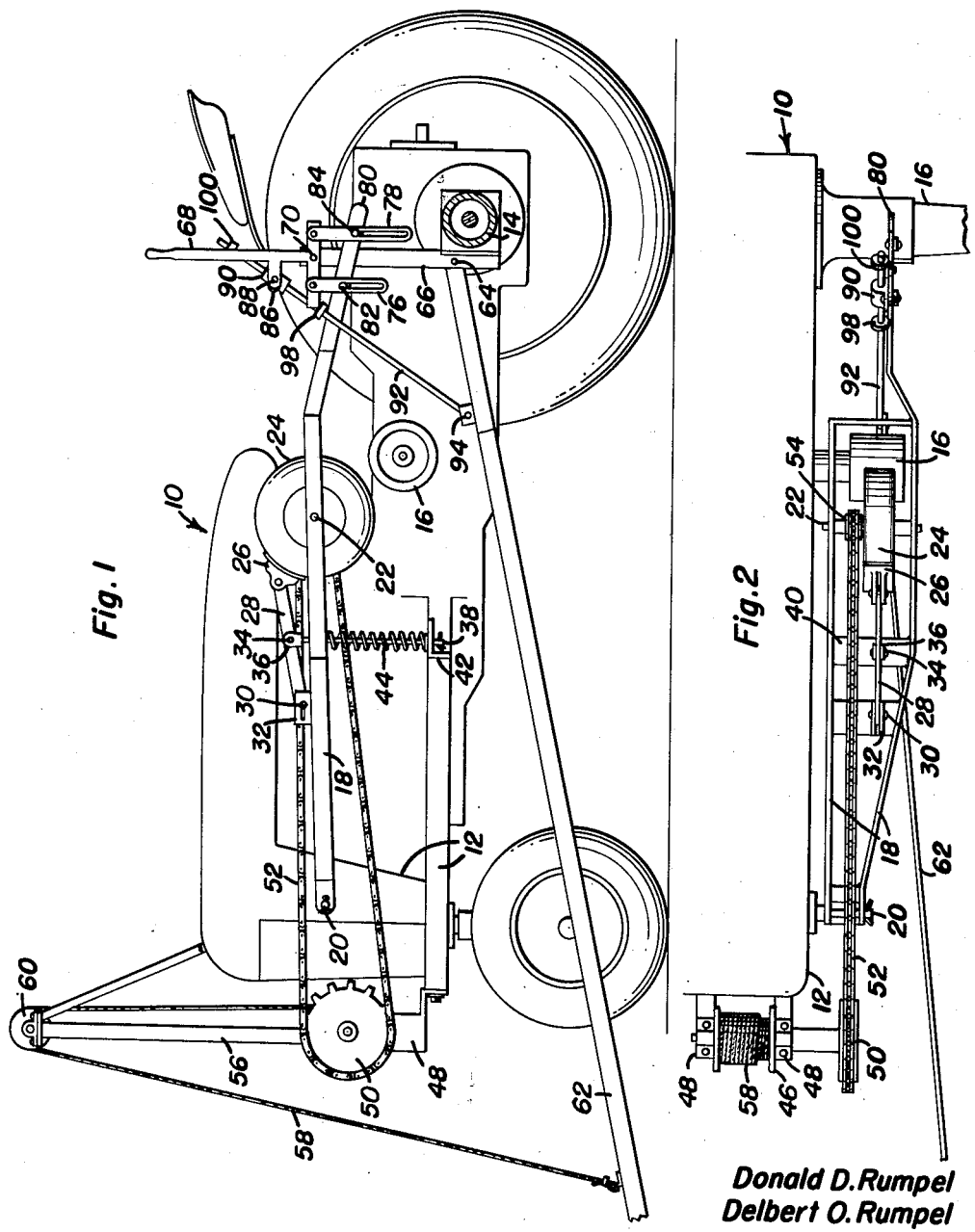

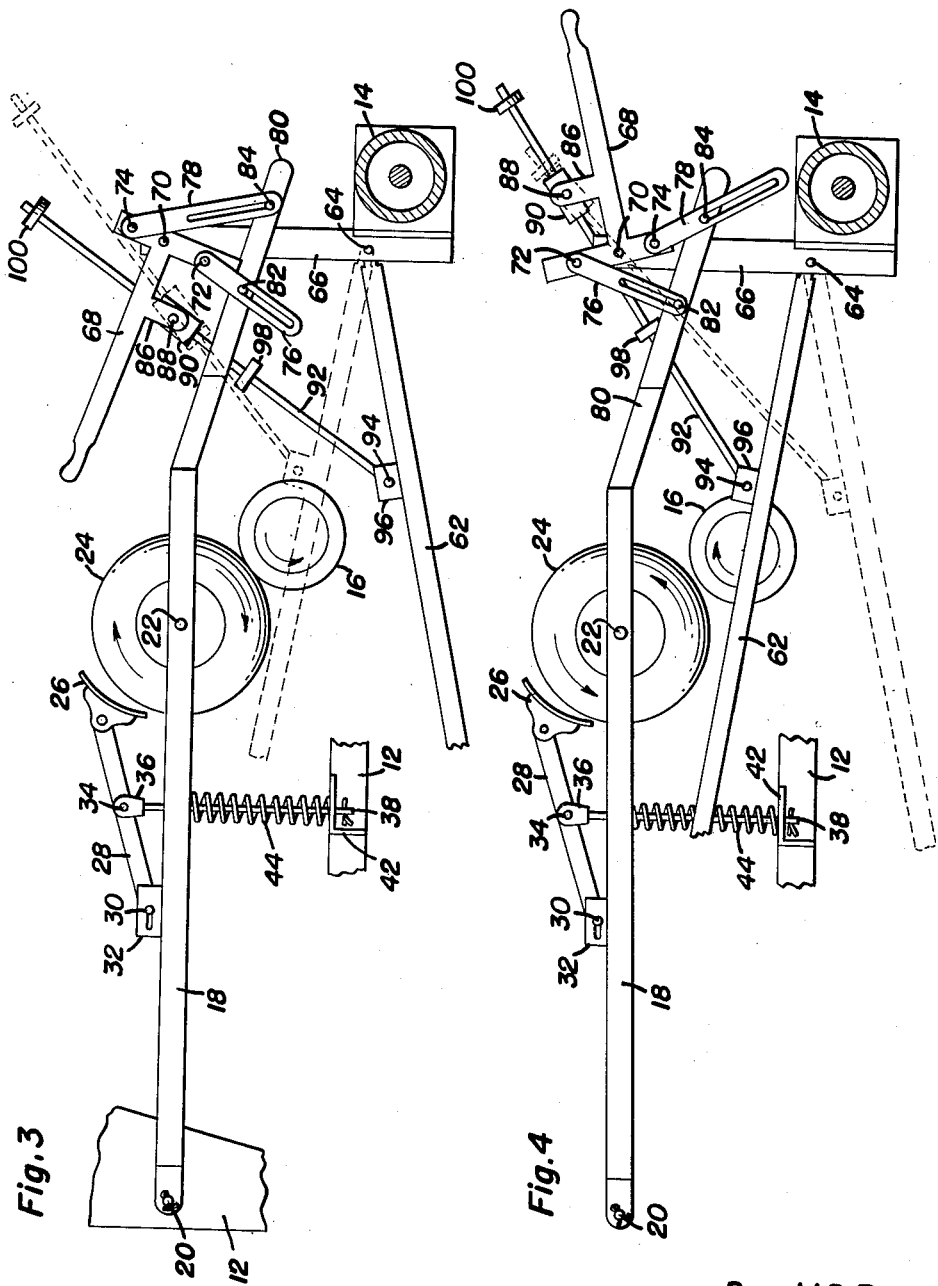

2,679,942

UNITED STATES PATENT OFFICE 2,679,942

POWER ATTACHMENT FOR TRACTORS AND AUTOMATIC CONTROL MEANS THEREFOR

Donald D. Rumpel and Delbert O. Rumpel, Parma, Idaho

Application January 3, 1952, Serial No. 264,822

3 Claims. (Cl. 214—131)

This invention relates to new and useful improvements and structural refinements in attachments for tractors, and the principal object of the invention is to provide a power device of the character herein described, which may be conveniently employed for operating a winch and, through the medium of the latter, for actuating a loading scoop, or the like, an important feature of the invention residing in the provision of means for automatically controlling the operation of the power attachment by the movement of the loading carrier which is actuated by the winch.

Some of the advantages of the invention reside in the simplicity of its construction, in its efficient and dependable operation, and in its adaptability for installation on tractors of different sizes and types.

With the above more important objects and features in view and such other objects and features as may become apparent as this specification proceeds, the invention consists essentially of the arrangement and construction of parts as illustrated in the accompanying drawings, in which:

Figure 1 is a side elevational view of a tractor showing the invention installed thereon, the near wheel of the tractor being removed;

Figure 2 is a fragmentary top plan view of the device shown in Figure 1, and

Figures 3 and 4 are fragmentary side elevational views illustrating the operation of the automatic control mechanism.

Like characters of reference are employed to designate like parts in the specification and throughout the several views.

Referring now to the accompanying drawings in detail, the general reference character 10 designates a conventional tractor including a frame 12 and a rear axle housing 14, the tractor also being provided with a power take-off pulley 16.

The invention contemplates the provision of an elongated frame 18 which is disposed longitudinally at one side of the tractor and is pivotally connected to the tractor frame at 20 so that the frame is swingable in a vertical plane.

The frame 18 provides support for a transverse shaft 22 on which is rotatably mounted a power wheel 24, the latter being frictionally engageable with the pulley 16 so that it is driven thereby when the frame 18 is swung downwardly to the position shown in Figure 3. However, a friction brake is provided for resisting rotation of the wheel 24 when it is disengaged from the pulley 16, this brake consisting of a brake shoe 26 carried by an arm 28 which is pivoted at 30 to a bracket 32 on the frame 18, while an intermediate portion of the arm 28 has pivoted thereto at 34 a yoke or fork 36 provided at the upper end of a vertical rod 38. This rod extends slidably through an aperture in a cross-piece 40 of the frame 18 and the lower end portion of the rod is slidable in an angle bracket 42 secured to the tractor frame 12. A compression spring 44 is positioned on the rod 38 between the bracket 42 and the cross-member 40 whereby to urge the frame 18 upwardly to a position where the wheel 24 is disengaged from the pulley 16 and the brake shoe 26 is in engagement with the wheel 24 as shown in Figure 1. However, by lowering the frame 18 so as to compress the spring 44, the wheel 24 and pulley 16 may be engaged, while at the same time the brake shoe 26 is disengaged from the wheel 24, as shown in Figure 3. Moreover, an intermediate position is possible as shown in Figure 4, wherein the wheel 24 is disengaged from the pulley 16, and, at the same time, the brake shoe 26 is disengaged from the wheel 24, so that unrestricted rotation of the wheel is possible.

A winch 46, supported by suitable brackets 48, is mounted at the front end of the tractor frame and is driven by a sprocket 50 connected by sprocket chain 52 to a second sprocket 54 secured to the aforementioned wheel 24. The front end of the tractor frame also carries an upright standard 56 and the cable 58 of the winch 46 passes over a pulley 60 at the upper end of the standard and is connected to the forward end portion of an elongated boom having boom arms 62. This boom straddles the tractor and the boom arms 62 are pivoted at the rear end thereof at 64 to an upstanding support 66 attached to the rear axle housing 14. The front end of the boom may be provided with a suitable loading scoop, or the like, (not shown).

Automatic means are provided for controlling the lifting and lowering of the frame 18, these means consisting of an inverted T-shaped lever 68 which is pivoted at 70 to the upper end of the support 66 and the laterally projecting arms thereof have pivoted thereto at 72, 74 respectively, a pair of slotted links 76, 78.

An integral extension 80 of the frame 18 is provided with a pair of studs 82, 84 which are slidable in the slots of the respective links 76, 78 and it is to be also noted that the lever 68 is provided with an extension 86 to which is pivoted at 88 a bored block 90. A control shaft 92 is freely slidable in the bore of this block and is connected at one end thereof by a pivot 94 to a bracket 96 on the boom arms 62, while the upper end portion of the rod 92 is equipped with a pair of spaced, adjustable collars 98, 100, which are engageable with the respective opposite ends of the block 90 upon sliding of the rod 92 therethrough.

Assuming the apparatus to be in its initial position as shown in Figure 1, movement of the control lever 68 (manually) to the forward position shown in Figure 3 will cause the link 76 and the stud 82 to press the frame 18 downwardly while the stud 88 simply slides in the slot of the link 78. During this action the wheel 24 will be operatively engaged with the pulley 16 and through the medium of the sprocket chain drive, the winch 46 will be energized so as to wind the cable 58 thereon and raise the boom arms 62 upwardly. Needless to say, during this entire procedure the brake shoe 26 will be disengaged from the wheel 24 as shown in Figure 3.

As the boom arms 62 are raised, the rod 92 will slide through the block 90 until the lower collar 98 abuts the block and eventually forces the control lever 68 to its initial position as shown in Figure 1, wherein the drive to the hoist will be disengaged and the brake shoe 26 again applied to the wheel 24 so as to sustain the boom in its elevated position.

However, by manually moving the control lever 68 rearwardly to the position shown in Figure 4, the link 78 and stud 84 will force the frame 18 downwardly to an insufficient extent to engage the wheel 24 with the pulley 16, but to a sufficient extent to disengage the brake shoe 26 from the wheel 24, whereupon the boom will automatically descend to the ground by the action of gravity. As the boom descends, the rod 92 will be slid downwardly through the block 90 and eventually the collar 100 will abut the block, thus forcing the lever 68 automatically to its neutral position as shown in Figure 1.

It should be understood that the relationship of the pivots 70, 72, 74, 82 and 84 is such that when the linkage is in the positions shown in Figures 3 or 4, it is "locked" thereby by "past center" positions of the pivots 72 or 74, and so remains until it is released by pressure of the collars 98 or 100 against the block 90.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

1. In combination with a tractor including a power take-off pulley, a power attachment comprising a winch mounted on said tractor, an elongated frame pivoted at one end thereof to the tractor and extending past said pulley, a drive wheel carried by said frame and frictionally engageable with the pulley, means operatively connecting said drive wheel to said winch, a friction brake engageable with said drive wheel when the drive wheel is disengaged from said pulley, resilient means normally urging said frame in a direction whereby said drive wheel engages said friction brake, a control lever pivoted to the tractor having a first means connected to said frame responsive to pivoting said lever to one position for moving said drive wheel into engagement with said pulley and a second means connected to said frame responsive to pivoting said lever to another position for moving said drive wheel out of engagement with both said brake and said pulley.

2. The combination of claim 1, wherein vertically swingable boom arms are pivoted to the tractor, said winch including a cable connected to said boom arms for raising and lowering the same, and automatic means responsive to the raising and lowering of the boom arms for actuating said control means.

3. In combination with a tractor including a power take-off pulley, a power attachment comprising a winch mounted on said tractor, an elongated frame pivoted at one end thereof to the tractor for swinging movement in a vertical plane and extending above said pulley, a drive wheel carried by said frame and frictionally engageable with the pulley when the frame is disposed in a lowermost position, means operatively connecting said drive wheel to said winch, a friction brake engageable with said drive wheel when said frame is raised to an uppermost position, resilient means for normally urging said frame into said uppermost position, an inverted T-shaped control lever pivoted at its lower end to the tractor and presenting oppositely extending arms, a link pivoted at one end thereof to the free end of each of said arms, and having a slot at the other end thereof, said frame having pins disposed within said slots.

References Cited in the file of this patent

UNITED STATES PATENTS

| Number | Name | Date |
|---|---|---|
| 2,334,010 | Jones et al. | Nov. 9, 1943 |
| 2,372,870 | Willrodt | Apr. 3, 1945 |
| 2,407,425 | Horning et al. | Sept. 10, 1946 |
| 2,448,631 | Selak | Sept. 7, 1948 |